United States Patent
Endres et al.

(10) Patent No.: US 8,409,693 B2
(45) Date of Patent: Apr. 2, 2013

(54) DATA CARRIER HAVING IDENTIFIERS

(75) Inventors: Günter Endres, München (DE); Georg Kruse, Aschheim (DE); Josef Riedl, Attenkirchen (DE)

(73) Assignee: Giesecke & Devrient GmbH, München (DE)

( * ) Notice: Subject to any disclaimer, the term of this patent is extended or adjusted under 35 U.S.C. 154(b) by 29 days.

(21) Appl. No.: 12/844,716

(22) Filed: Jul. 27, 2010

(65) Prior Publication Data

US 2010/0290039 A1    Nov. 18, 2010

Related U.S. Application Data

(63) Continuation of application No. 10/579,289, filed on May 12, 2006, now abandoned.

(30) Foreign Application Priority Data

Nov. 12, 2003   (DE) .................................. 103 53 092

(51) Int. Cl.
*B32B 3/00*         (2006.01)
*B42D 15/00*    (2006.01)

(52) U.S. Cl. ........ 428/201; 428/209; 428/913; 428/916; 283/92; 283/109; 283/111

(58) Field of Classification Search ............... 428/195.1, 428/201, 206, 207, 209, 913, 916; 283/75, 283/77, 87, 92, 93, 94, 109, 111
See application file for complete search history.

(56) References Cited

U.S. PATENT DOCUMENTS

| | | | |
|---|---|---|---|
| 5,044,707 A * | 9/1991 | Mallik | 359/2 |
| 5,093,184 A * | 3/1992 | Edwards | 428/195.1 |
| 7,243,951 B2 * | 7/2007 | Cote et al. | 283/72 |
| 2005/0104364 A1 * | 5/2005 | Keller et al. | 283/72 |

FOREIGN PATENT DOCUMENTS

| | | |
|---|---|---|
| DE | 2907004 | 8/1980 |
| EP | 0219012 | 4/1987 |
| WO | WO 03053713 A1 * | 7/2003 |

* cited by examiner

*Primary Examiner* — Gerard Higgins
(74) *Attorney, Agent, or Firm* — K. David Crockett, Esq.; Niky Economy Syrengelas, Esq.; Crockett & Crockett, PC

(57) ABSTRACT

The invention relates to a data carrier into which, by means of a laser beam, identifiers are introduced that are visible in the form of irreversible changes, caused by the laser beam, in the optical properties of the data carrier. According to the present invention, the data carrier comprises a laser-sensitive layer (20) that is opaque in the visible spectral range, and that is combined with a securing layer (22) that is metallized at least in a sub-area, the identifiers (30, 32) being introduced by the laser beam simultaneously and in perfect register into the laser-sensitive layer (20) and the metallized sub-area (24) of the securing layer (22).

13 Claims, 3 Drawing Sheets

DATA CARRIER HAVING IDENTIFIERS

This application is a continuation application of U.S. application Ser. No. 10/579,289, filed May 12, 2006, now abandoned, which claims priority to PCT/EP2004/012628, filed Nov. 8, 2004, which claims priority to DE 10353092.4, filed Nov. 12, 2003.

FIELD OF THE INVENTIONS

The invention relates to a data carrier into which, by means of a laser beam, identifiers are introduced that are visible in the form of irreversible changes, caused by the laser beam, in the optical properties of the data carrier. The present invention further relates to a method for manufacturing such a data carrier, as well as a method for checking the integrity of such data carriers.

BACKGROUND OF THE INVENTIONS

It is known to personalize identification cards, such as credit cards, bank cards or identity cards, by means of laser engraving. In personalization by laser engraving, the optical properties of the card material are irreversibly changed, in the form of a desired identifier, through suitable guidance of a laser beam.

For example, the identification card described in publication DE 29 07 004 includes two cover sheets and a card insert in which, through one of the two cover sheets, the personalization data are inscribed with a laser beam. To impede the reproduction of such identification cards with modern copiers, the personalization data are often introduced into metallic layers in front of a dark background. Since the metallic substrate causes a specular reflection of incident light beams, and the detector in copiers is usually disposed such that it can pick up only the diffusely scattered light from the original, the metallic surfaces and the introduced data appear all black in the copy.

Despite the recognized high security level of laser-personalized identification cards, there is a residual risk of forgery as a result of a separation of card front and card back and the resulting possible manipulation of the information located inside, such as text and image objects. In particular, after a separation of the card sheets, a metal foil located inside is counterfeitable or replaceable.

Based on that, the object of the present invention is to specify a data carrier of the kind described above having increased counterfeit security. Furthermore, it should be possible, preferably also for laypersons, to detect manipulation attempts with simple means.

This object is solved by the data carrier having the features of the claim 1. A method for manufacturing such a data carrier and a method for checking the integrity of such data carriers are specified in the coordinated claims. Developments of the present invention are the subject of the dependent claims.

SUMMARY

The data carrier according to the present invention builds on the state of the art in that it comprises a laser-sensitive layer that is opaque in the visible spectral range and that is combined with a securing layer that is metallized at least in a sub-area. Said identifiers are introduced by the laser beam simultaneously and in perfect register into the laser-sensitive layer and the metallized sub-area of the securing layer. In this way, the integrity of the data carrier can be checked at any time by checking the register accuracy of the identifiers. For this, a very luminous flashlight or even viewing the data carrier against daylight is sufficient.

Advantageously, the introduction of the identifiers into the securing layer can occur, for example, through material ablation in the metallized sub-area or through a local transformation of the metal into a transparent or translucent modification.

In expedient embodiments, one or more intermediate layers are disposed between the laser-sensitive layer and the securing layer. The intermediate layers are preferably transparent and can also be colored and/or printed on. They can also be furnished with fluorescent properties. In particular, if the intermediate layers are not continuously transparent, they advantageously exhibit one or more apertures in the area of the identifiers to enable the identifiers to be seen and to use the opaque background as a contrast element.

Advantageously, the metallized sub-area can be vapor deposited on the securing layer or formed by printing a layer of a metallic effect ink. The metallized sub-area can also exhibit a diffraction pattern, especially a hologram pattern, such that an additional angle-dependent image impression is created for the viewer.

The laser-sensitive layer is preferably formed from a plastic foil that is doped at least in a sub-area. In other, likewise advantageous embodiments, the laser-sensitive layer is formed from a plastic foil that is provided at least in a sub-area with a printing layer that absorbs the laser radiation. The plastic foil can then be transparent, as the opacity required for the contrast effect is provided by the printing layer. Furthermore, the plastic foil can be furnished with fluorescent properties, for example by incorporating fluorescent pigments during manufacturing of the foil. In both variants, the plastic foil can be composed of, for example, polycarbonate or polyester. It is also conceivable to use paper as the laser-sensitive layer. Preferably, paper made of cotton fibers is used. The laser-sensitive layer can also be a metal layer. Preferably, the metallized sub-area and the laser-sensitive layer are then formed of metals of different colors.

While only a single laser-sensitive layer that is opaque in the visible spectral range has been described so far, according to the present invention, it is also possible to provide multiple such layers in the data carrier. The various laser-sensitive layers can then be provided with different types of identifiers or combined with different metal layers.

The identifiers introduced into the data carrier can include any patterns or characters. Identifiers that comprise a halftone pattern reproduced from an original, especially an image, such as a portrait, are particularly well suited, as the human eye can perceive even the smallest discrepancies in congruence there. The halftone pattern is preferably introduced in screening technique, different brightness levels of the halftone pattern being produced especially by a different grid-point density, a different grid-point size and/or by a different grid-point blackening.

In an advantageous development of the present invention, the metallized sub-area, together with the opaque layer, displays, in impinging light, a tilt effect in which the image impression of the introduced identifiers switches from a positive image to a negative image when the viewing angle changes. As explained in detail below, this contrast reversal is explained by the interplay of the specularly reflecting metallic sub-areas and the diffusely scattering identifier areas. This effect can also be used as copy protection.

Instead of a single metallized securing layer, multiple such securing layers can also be provided. For example, a spatial effect can be achieved by combining metallized securing layers in different levels. The metallized securing layers can additionally be provided with a laser tilt image pattern, as described for example in publication EP 0219 012 A2.

For protection, the laser-sensitive layer and/or the securing layer can be covered with further layers that are transparent at least in the area of the identifiers, such that the laser-sensitive layer or the securing layer, preferably both layers, are disposed in the interior of the data carrier.

The data carrier preferably constitutes an identification card, such as a credit card, bank card, cash card, authorization card, identity card or passport personalization page. The data carrier can also constitute a transfer element disposed on a carrier layer for application to an identification card or the like.

To manufacture a described data carrier, the laser-sensitive layer that is opaque in the visible spectral range is combined with the securing layer that is metallized at least in a sub-area and, where appropriate, with further layers, and, for introducing the identifiers, the layer structure is impinged on from the side of the laser-sensitive layer with laser radiation, causing the identifiers to be introduced simultaneously and in perfect register into the laser-sensitive layer and the metallized sub-area of the securing layer. The laser beam preferably impinges vertically on the layer structure. However, any other angle of incidence of the laser beam on the layer structure is also conceivable. Thus, if the laser beam is radiated at a certain angle, e.g. 70°, to the card surface, the congruence of the engraved identifiers in the different levels of the layer structure is, in principle, preserved. When viewing, the congruence must then, of course, be checked at the angle at which the identifier was engraved in the layer structure by means of a laser.

The identifiers are preferably introduced with pulsed laser radiation, preferably having a wavelength in the infrared or visible spectral range. Advantageously, a halftone pattern reproduced in screening technique from an original is used as an identifier, different brightness levels of the halftone pattern being produced especially by a different grid-point density, a different grid-point size and/or by a different grid-point blackening. Said grid-point density is expediently selected to be between 50 and 500 dpi (dots per inch), preferably between 150 and 250 dpi, particularly preferably between 170 and 200 dpi.

To check the integrity of a data carrier of the kind described, the data carrier is illuminated with a strong light source, the register accuracy of the identifiers in the opaque, laser-sensitive layer and the metallized sub-area of the securing layer is determined, and on the basis of the determined register accuracy, the integrity of the data carrier is assessed.

Overall, the present invention provides a significant increase in the security of personalized data carriers, and at the same time, simple verifiability of the protection is given. When manufacturing cards, for example, three pieces of information for protecting against forgery can be introduced into the card material in one work step without substantial impact on the throughput:

1) a photo, for example on the front of the card,
2) a transmitted light effect that delivers, depending on the kind of personalization, a positive or negative image, and
3) a personalization of a metallized foil layer, opposite and absolutely congruent to the photo on the front of the card.

Further exemplary embodiments and advantages of the present invention are explained below by reference to the drawings. To improve clarity, a depiction to scale and proportion was dispensed with in the drawings.

BRIEF DESCRIPTION OF THE DRAWINGS

Shown are.

DETAILED DESCRIPTION OF THE INVENTIONS

Figure 1:
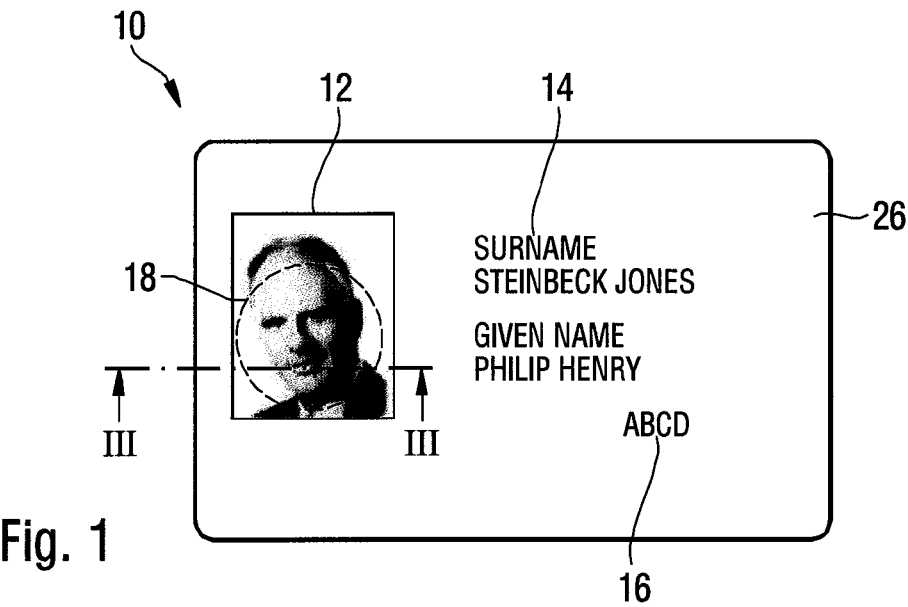
FIG. 1 the front view of an identification card according to an exemplary embodiment of the present invention, diagrammed schematically, FIG. 2 the rear view of the identification card in FIG. 1, FIG. 3 a cross section through the identification card in FIG. 1 along the line III-III, FIGS. 4 to 7 cross-sectional views of further identification cards according to exemplary embodiments of the present invention.
Figure 2:
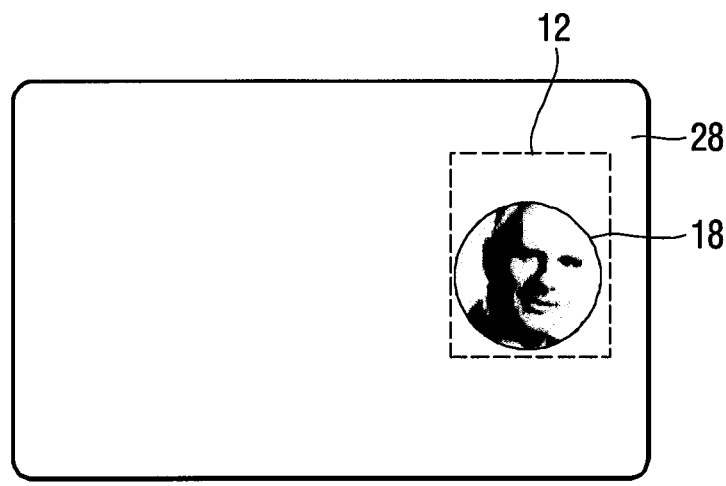

FIGS. 1 and 2 show the front and rear view of an identification card 10 according to the present invention, diagrammed schematically. The identification card 10 includes a portrait 12 of the cardholder, as well as further personal data 14, in the exemplary embodiment the first and last name of the holder. Furthermore, the identification card can include further personal or non-personal data 16, such as birth date, nationality, issuing authority, issue date and the like. The portrait 12 and the name 14 on the identification card 10 are for illustration purposes only and do not correspond to any real person.

While the front 26 of the identification card 10 displays the portrait of the cardholder as a screened halftone image 12, from the card back 28, a portion of the portrait is visible in a metal foil 18. Due to their creation simultaneously and in perfect register, described below, in an intact identification card 10, the halftone portrait 12 and the portrait inscribed in the metal foil 18 are disposed completely congruently.

This congruence can be checked with simple aids, for example with a strong flashlight or even by viewing the identification card against daylight. In a manipulation attempt through separation of the card foils and replacement or forgery of the metal foil 18 located inside, the congruence of the two portraits is destroyed and can then no longer be reconstructed with the original accuracy. The personalization of the card front and the metal foil located inside is thus protected effectively and easily verifiably.

Figure 3:
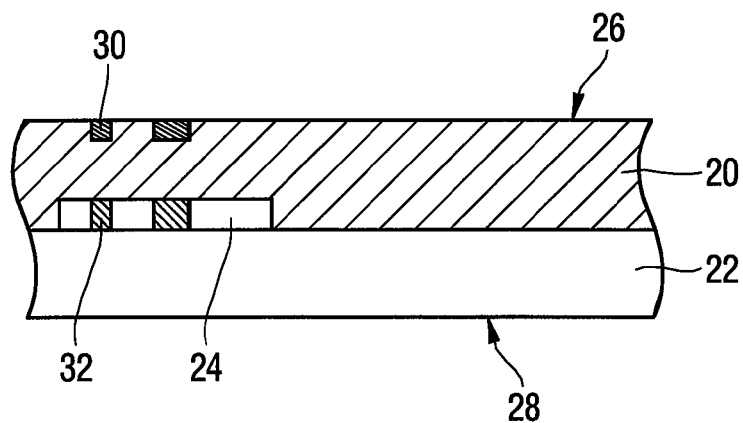

The layer structure of the identification card 10 and its manufacture will now be described with reference to the simplified schematic diagram in FIG. 3. In the simplest case, the identification card 10 is composed of a core layer 20 that is opaque in the visible spectral range, and a transparent foil 22 on which is vapor deposited, in a sub-area, a metal layer 24, for example an aluminum, copper or gold layer.

For personalization, the identification card 10 is impinged on from the card front 26 with pulsed, infrared laser radiation. For this, the core layer 20 is doped with additives that are capable of absorbing the infrared laser radiation and effecting a local blackening 30 of the core layer 20. The additives are, for example, fillers. It is possible to control the absorption of the laser light and thus the degree of blackening depending on the kind of filler and/or the filler content. The pulse energy of the laser radiation is selected such that it penetrates the core layer 20 and is absorbed in the metal layer 24. Through the influence of the laser radiation, the optical properties of the thin metal layer 24 in the captured modification areas 32 are changed locally such that the portrait inscribed from the front is visible mirror reversed when viewed from the card back 28.

The change of state of the metal layer 24 can, for example, consist in a partial or complete local ablation of the metal layer or in a local transformation of the metal layer into a transparent or translucent modification.

In the exemplary embodiment, a Nd:YAG laser having a wavelength of 1.064 µm, a beam diameter of about 60 µm and a pulse energy of up to 2 $J/cm^2$ was used to introduce the identifiers. Other infrared lasers, such as Nd:glass lasers or the longer-wave $CO_2$ lasers, are also possible for the personalization. It is understood that the laser parameters concretely used in each case, such as beam diameter and pulse energy, are matched to the number and the thickness of the layers to be engraved.

By scanning the image surface of the portrait 12 in a defined grid and a pulse-to-pulse variation of the laser output corresponding in each case to the blackening level, a halftone image like the portrait 12 having a resolution of, for example, 200 dpi can easily be produced.

Through suitable selection of the background of the metal layer 24, it is possible to achieve a tilt effect when viewed from the card back 28. Here, the image impression tilts in reflected light when the viewing angle changes, independently of the angle of tilt, from a positive image to a negative image. Without being bound to a specific explanation, the contrast reversal is explained by the fact that light incident from the back is specularly reflected by the unmodified areas of the metal layer 24, while it scatters diffusely in the ablated or modified areas 32. If the viewer is located in the solid angle of the specular reflection, then the metal layer 24 appears brighter to him than the modified areas 32, while from other viewing angles, the diffusely reflecting area 32 appears to him to be unchanged in brightness, but the metal layer areas appear dark. This effect is particularly noticeable when the metal layer 24 is disposed in front of a light, for example white or pastel-colored, background.

Figure 4:
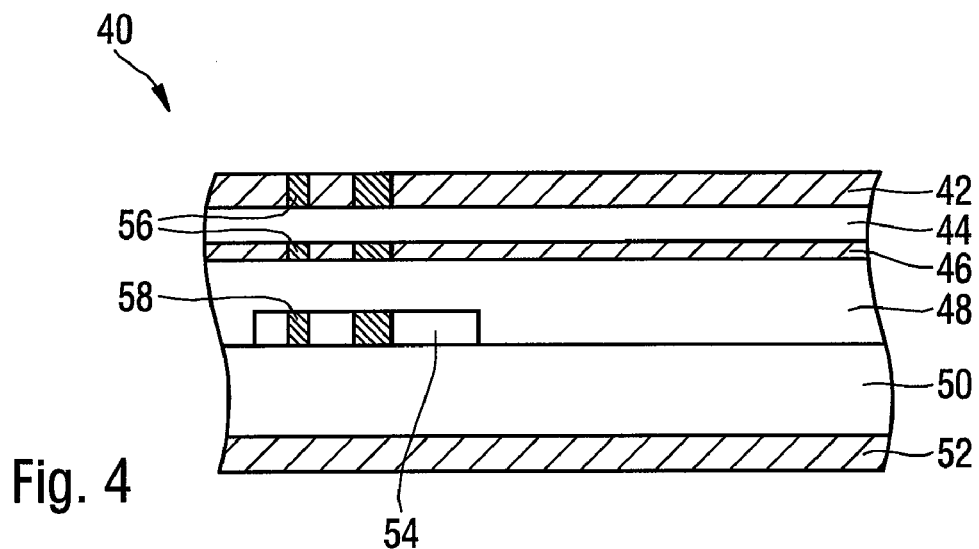

FIG. 4 shows a further exemplary embodiment of an inventive identification card 40 having a more complex layer structure. The layer sequence of the identification card 40 comprises a transparent lightly doped foil 42, a transparent undoped foil 44, a transparent heavily doped foil 46, an opaque foil 48, a transparent undoped foil 50 and a transparent lightly doped foil 52. In the exemplary embodiment, all of the cited foils are polycarbonate foils. If appropriate, the foils are furnished with fluorescent properties.

Prior to joining the foils, a metal layer 54, here an aluminum layer, of several tenths of a µm thickness was vapor deposited on the transparent undoped foil 50. The foils were then laminated and the card thus formed, as described above, was personalized by laser engraving. Thereby, local blackenings 56 were created in the doped foils 42 and 46 due to the absorption of the laser radiation. At the same time, due to the laser radiation in the modification areas 58, the optical properties of the metal layer 54 were irreversibly changed locally and congruently with the blackenings 56. Further identifiers can be inscribed in the doped foil 52 from the back of the identification card 40.

Figure 5:
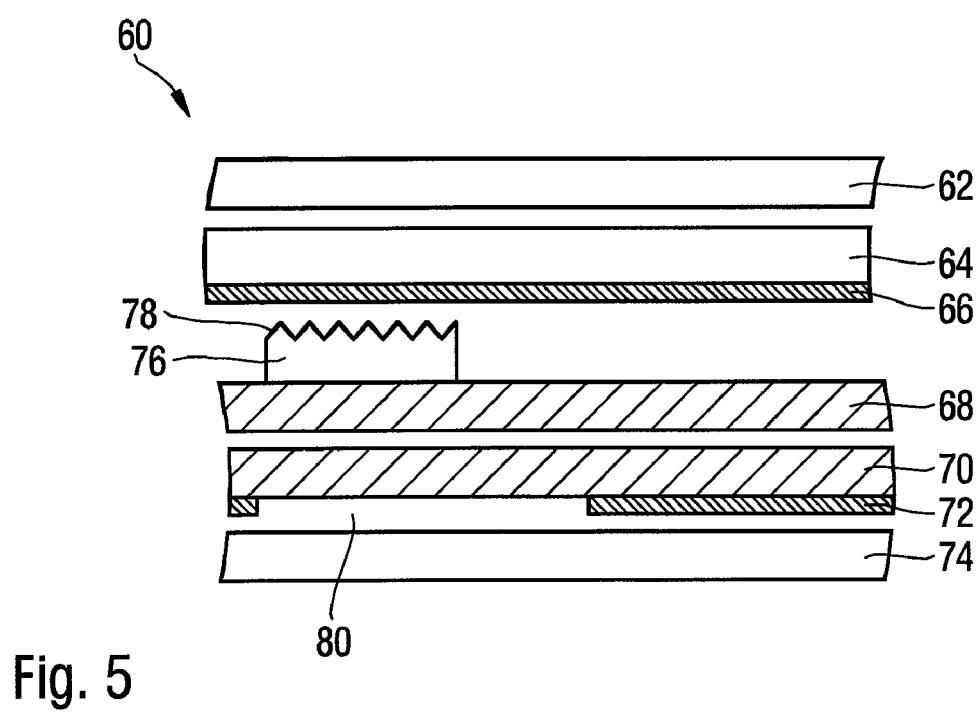

For the purposes of clear illustration, the exemplary embodiment in FIG. 5 is shown in an exploded view in which the individual layers have not yet been joined and in which the personalization of the identification card 60 has not yet occurred. The layer structure of the identification card 60 comprises a transparent lightly doped foil 62, a printed-on transparent foil 64 that can be undoped or lightly doped, a heavily doped transparent foil 68 that is provided with a thin metal layer 76, a printed-on heavily doped transparent foil 70 and a lightly doped transparent foil 74. In this exemplary embodiment, too, the cited foils are polycarbonate foils. Here, too, the foils can be furnished with fluorescent properties.

The foils 64 and 70 are each provided with a printing layer, 66 and 72, the printing layer 72 exhibiting, in the area of the metal layer 76 or at least in the area of the introduced identifiers, apertures 80 to enable the identifiers to be seen. In this exemplary embodiment, the opacity of the card body is achieved, not through an opaque foil, but rather through the printing layers 66 and 72 that are opaque at least in sub-areas. In particular, the printing layer 66 is opaque in the area of the metal layer 76. The printing layers 66 and/or 72 can also be applied with effect inks, such as fluorescent inks or inks containing optically variable pigments.

In the exemplary embodiment, the metal layer 76 is formed by a hologram patch having a diffraction pattern 78 that, in a manner that is known per se, gives the viewer, in addition to the above-described portrait, an angle-dependent image impression. The hologram patch can include, for example, an angle-dependent color play or an image motif that moves or changes when tilted. Such a hologram patch can, of course, be used in all of the embodiments described instead of a simple metal layer.

Figure 6:
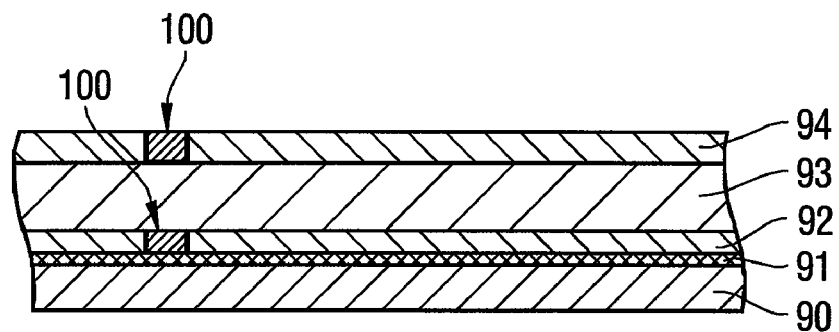

FIG. 6 shows a further exemplary embodiment of an identification card according to the present invention. The layer sequence of the card comprises a transparent foil 90 that was printed on across its entire surface with a fluorescent imprint 91. Above that is located a metallic layer, preferably silver or gold colored 92. This is covered with a transparent foil 93 on which, in turn, a metallic layer 94 is located that is preferably silver or gold colored. The metal layers 94 and 92 preferably have a differently metallic appearance, such that the card, viewed from the top and the bottom, respectively, exhibits a different appearance. This card structure is now impinged on from the side of the layer 94 with laser radiation, such that the marking 100 is produced in the layers 92 and 94. In this case, the marking is a metal ablation, such that apertures are created in the metal layer. By illuminating the card from the side of the layer 90 with UV radiation, to a viewer viewing the card from the side of the coating 94, fluorescent patches are perceptible in the area of the aperture 100. The apertures 100 that appear fluorescent to the viewer when illuminated appropriately can be pictographic illustrations as well as codes.

Figure 7:
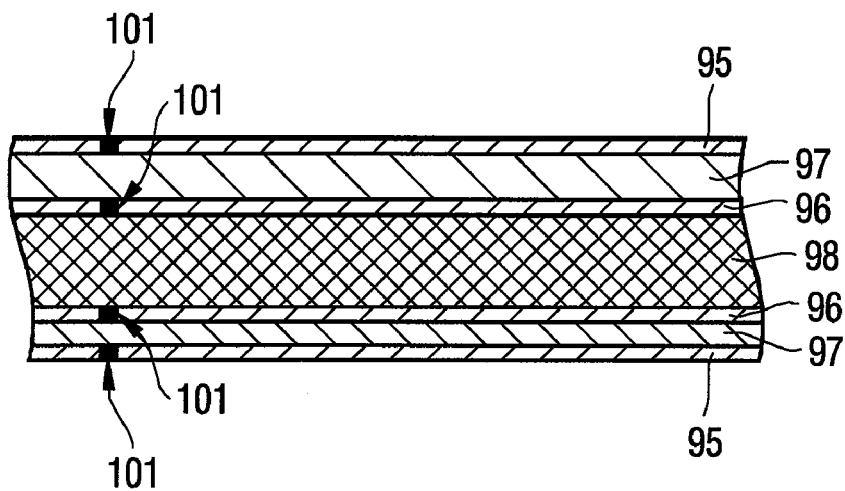

FIG. 7 shows a further exemplary embodiment according to the present invention. The layers 95 are metallic layers that were vapor deposited on a transparent foil 97. The layers 96 are likewise metallic layers that were vapor deposited on the side opposite the metallic layer 95. These two layer structures were each laminated onto one side of a foil 98 doped with a fluorescent pigment. When this structure is impinged on with laser radiation, the markings 101 are produced in the metal layer. By removing the corresponding metal layer on the patches 101, the viewer can again perceive, given appropriate illumination with exciting radiation, fluorescent marks on the patches 101.

The invention claimed is:

1. A data carrier having identifiers, wherein into said data carrier by means of a laser beam, identifiers are introduced that are visible in the form of irreversible changes in the optical properties of the data carrier, caused by the laser beam, wherein:

the data carrier comprises, in the stated order, a first metal layer, a transparent foil, a second metal layer and a fluorescent layer, and;

the identifiers are introduced into the first metal layer and the second metal layer simultaneously and in perfect register, the identifiers being gaps in the metal layers that are produced by metal ablation by means of the laser beam wherein the fluorescent layer can be seen through the gaps in the metal layers.

2. The data carrier according to claim 1, wherein the fluorescent layer is a printing layer that is imprinted on a second transparent foil and wherein the data carrier comprises, in the stated order, the first metal layer, the first transparent foil, the second metal layer, the fluorescent layer and the second transparent foil.

3. The data carrier according to claim 1, wherein the fluorescent layer is a foil doped with a fluorescent pigment.

4. The data carrier according to claim 1, wherein at least one of the first or second metal layers is silver or gold colored.

5. The data carrier according to claim 1, wherein the first and second metal layer exhibit a different metallic appearance.

6. The data carrier according to claim 1, wherein the identifiers comprise a halftone pattern reproduced from an original.

7. The data carrier according to claim 6, wherein the halftone pattern is a portrait.

8. The data carrier according to claim 7, characterized in that the halftone pattern is introduced using a screening technique, wherein different brightness levels of halftone pattern can be produced by a different grid-point density and/or a different grid-point size.

9. A method for manufacturing a data carrier having identifiers according to claim 1, in which:
a layer structure is provided that comprises, in the stated order, a first metal layer, a transparent foil, a second metal layer and a fluorescent layer, and in which;
to introduce the identifiers, the layer structure is impinged on with laser radiation from a side of the first metal layer that faces away from the transparent foil, through which the identifiers are introduced as gaps into the first metal layer and the second metal layer simultaneously and in perfect register through metal ablation by means of the laser beam, wherein the fluorescent layer can be seen through the gaps in the metal layers.

10. The method according to claim 9, characterized in that the identifiers are introduced with pulsed laser radiation, having a wavelength in the infrared spectral range.

11. The method according to claim 9, characterized in that the identifiers comprise a halftone pattern reproduced from an original, wherein the halftone pattern is introduced in a screening technique, wherein different brightness levels of the halftone pattern are produced by a different grid-point density, by a different grid-point size, and/or by a different grid-point blackening.

12. A method for checking the integrity of a data carrier according to claim 1 in which the register accuracy of the identifiers in the first metal layer and the second metal layer is checked by illumination with UV radiation from a side of the fluorescent layer that faces away from the second metal layer and the integrity of the data carrier is assessed on this basis.

13. A data carrier manufactured according to claim 9, in which the register accuracy of the identifiers in the first metal layer and the second metal layer can be checked by illumination with UV radiation from a side of the fluorescent layer that faces away from the second metal layer and the integrity of the data carrier can be assessed on this basis.

* * * * *